United States Patent
Ookuma

(10) Patent No.: US 9,148,541 B2
(45) Date of Patent: Sep. 29, 2015

(54) INFORMATION PROCESSING APPARATUS, METHOD OF CONTROLLING THE SAME, AND STORAGE MEDIUM

(75) Inventor: Satoshi Ookuma, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 456 days.

(21) Appl. No.: 13/524,793

(22) Filed: Jun. 15, 2012

(65) Prior Publication Data

US 2013/0018940 A1    Jan. 17, 2013

(30) Foreign Application Priority Data

Jul. 14, 2011  (JP) .................................. 2011-155949

(51) Int. Cl.
*G06F 15/16*    (2006.01)
*H04N 1/00*    (2006.01)

(52) U.S. Cl.
CPC ....... *H04N 1/00896* (2013.01); *H04N 1/00408* (2013.01); *H04N 1/00411* (2013.01); *H04N 1/00464* (2013.01); *H04N 1/00928* (2013.01); *H04N 1/00973* (2013.01)

(58) Field of Classification Search
CPC ............. G06F 3/1205; H04N 1/00204; H04N 1/00206; H04N 1/00896; H04N 1/00928
USPC ................... 709/203, 217, 219; 358/1.1, 1.15
See application file for complete search history.

(56) References Cited

U.S. PATENT DOCUMENTS

| | | | |
|---|---|---|---|
| 7,639,246 B2 * | 12/2009 | Lee ................................ | 345/204 |
| 8,384,709 B2 * | 2/2013 | Sakura et al. ................. | 345/418 |
| 2003/0076351 A1 * | 4/2003 | Ide et al. ........................ | 345/738 |
| 2005/0105135 A1 * | 5/2005 | Takahashi ..................... | 358/1.18 |
| 2011/0299123 A1 * | 12/2011 | Utsumi et al. ................ | 358/1.15 |
| 2012/0218602 A1 * | 8/2012 | Sakura et al. ................. | 358/1.15 |

FOREIGN PATENT DOCUMENTS

| | | |
|---|---|---|
| JP | 2001-228857 A | 8/2001 |
| JP | 2003-131864 A | 5/2003 |
| JP | 2007-172074 A | 7/2007 |
| JP | 2008-047078 A | 2/2008 |
| JP | 2010-128990 A | 6/2010 |

OTHER PUBLICATIONS

Japanese Office Action issued in corresponding application No. 2011-155949 on Apr. 27, 2015.

* cited by examiner

*Primary Examiner* — Frantz Jean

(74) *Attorney, Agent, or Firm* — Carter DeLuca Farrell & Schmidt, LLP

(57) ABSTRACT

This invention provides a technique of switching the display screen from a standby screen to a function selection screen in a short period of time in an information processing apparatus which displays screens on a display unit based on the screen data obtained from a server apparatus. To achieve this, an information processing apparatus (MFP) of the invention obtains screen data of a function selection screen (initial screen) from a server apparatus (Web server) while displaying, on a display unit, a standby screen based on screen data obtained from the Web server in a standby state. The MFP switches the display of the display unit from the standby screen to the function selection screen based on the obtained screen data upon receiving a close instruction for the standby screen during the display of the standby screen.

8 Claims, 7 Drawing Sheets

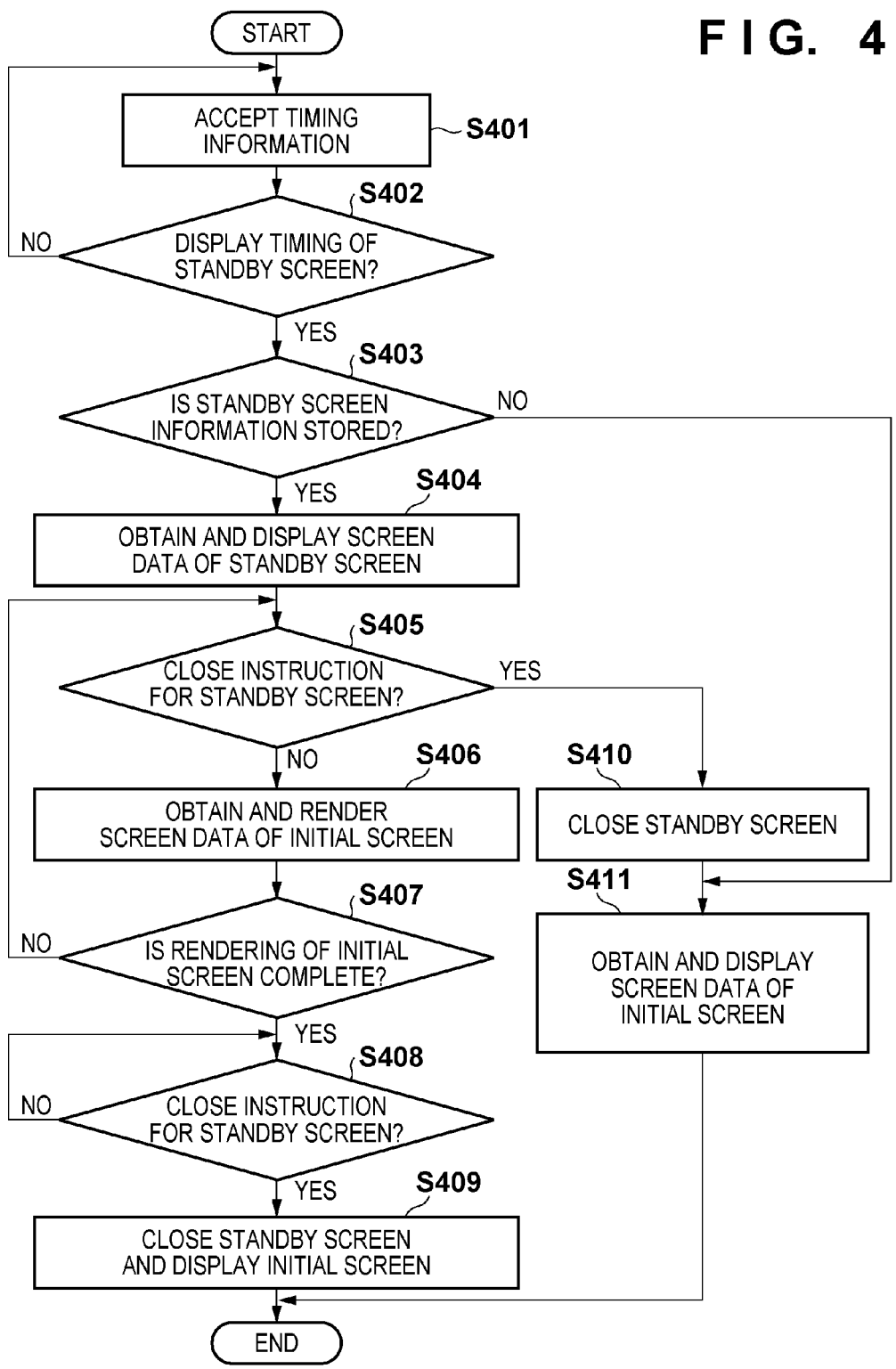

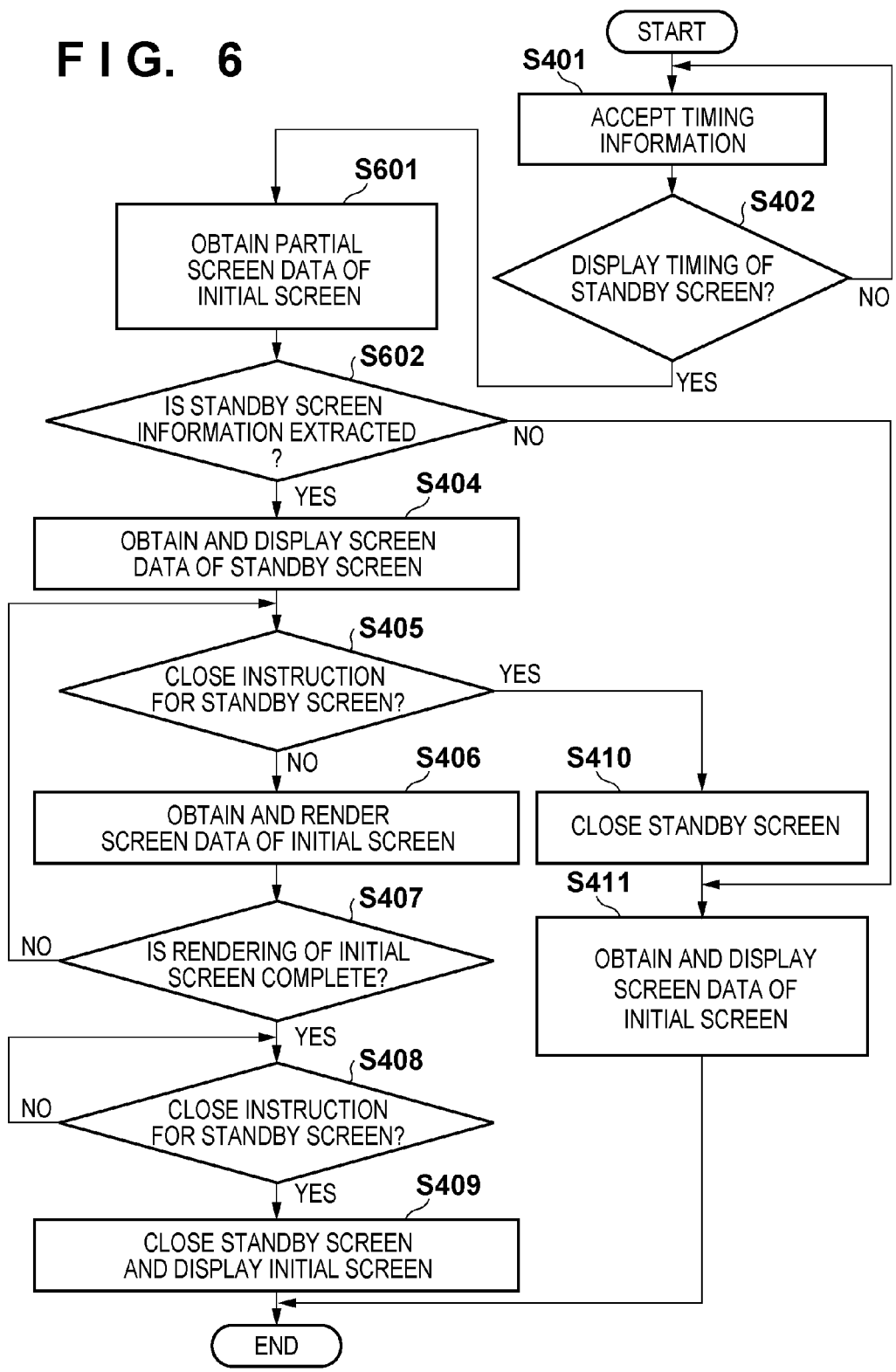

INFORMATION PROCESSING APPARATUS, METHOD OF CONTROLLING THE SAME, AND STORAGE MEDIUM

BACKGROUND OF THE INVENTION

1. Field of the Invention

The present invention relates to an information processing apparatus, a method of controlling the same, and a storage medium.

2. Description of the Related Art

There is generally known a technique of making an information processing apparatus such as a PC obtain a content from a server apparatus such as a Web server connected via a network and making a Web browser installed in the information processing apparatus display the obtained content on a screen display unit. The content provided from the Web server includes a file and image data created by a structured language such as HTML. Upon accepting an input from the user with respect to the screen displayed on the screen display unit by the Web browser via an operation unit (input device), the information processing apparatus transmits the input information to the Web server. With this operation, the information processing apparatus transmits an instruction from the user as an instruction to the Web server. That is, using a Web browser allows the use of the operation unit of the information processing apparatus as an input device for instructions to the Web server.

Recently, some of MFPs (Multi Functional Peripherals) including a scanner and a printer have a Web browser like that described above. Such an MFP makes the Web browser display an operation screen based on the content provided from a Web server on a screen display unit. Upon accepting an instruction input from the user via the displayed operation screen, the MFP transmits the input information as an instruction from the user to the Web server. The Web server transmits, to the MFP, an instruction to execute processing (for example, scanning processing and printing processing) corresponding to the instruction received from the MFP. In this manner, the Web server transmits, to the MFP via a network, an instruction to execute processing corresponding to the instruction input from the user via the MFP, thereby implementing image processing and a user management function which are difficult to implement by the MFP alone.

If an MFP is designed to implement a plurality of functions via a Web server, the Web server can provide the MFP with a function selection screen, as a Web content, to allow the user to select a function to be used. When the MFP displays an operation screen on the image display unit by using the Web browser in the above manner, it is possible to register such a function selection screen as a homepage of the Web browser. When the user starts up such an MFP or stops input for a predetermined period of time, the MFP may display, on the screen display unit, an advertising screen for providing an advertisement or propaganda to the user, an alarm screen for alarming or notifying the user of information associated with the use of the apparatus, or the like as a standby screen.

As in the case of a content on the function selection screen, it is possible to provide a content on the above standby screen, as a content for the Web browser, from the Web server to the MFP. It is likely that the information of such a standby screen is frequently changed. Therefore, holding a content in the Web server makes it easier to maintain and manage the screen than holding the content in the MFP. In this case, the MFP causes the Web browser to display the content provided from the Web server, associated with the standby screen as well as the function selection screen, on the screen display unit.

Japanese Patent Laid-Open No. 2003-131864 discloses a technique of displaying a screen saver as a standby screen on a user terminal (information processing apparatus) by using a Web browser based on the content data of the screen saver provided from a Web site (Web server). According to Japanese Patent Laid-Open No. 2003-131864, it is possible for a Web site provider to make the information processing apparatus perform advertisement display by using the content data of the screen saver provided to the information processing apparatus. In addition, it is possible to make the information processing apparatus display advertising information held by a Web server without interfering with user operation by displaying the screen saver when an input device is not operated for a predetermined time.

The MFP (information processing apparatus) can switch the display of the screen display unit from the standby screen to the function selection screen when the user performs some kind of operation while the standby screen is displayed in a standby state. In this case, when the MFP is to display both the standby screen and the function selection screen based on the Web content provided from an external Web server, the MFP cannot switch from the standby screen to the function selection screen in a short period of time. More specifically, when the MFP switches the display of the screen display unit from the standby screen to the function selection screen, it takes some time for the MFP to obtain the Web content of the function selection screen from the Web server. It takes further time for the MFP to analyze the obtained Web content and render the content into the function selection screen. As a consequence, when using the MFP, the user cannot quickly select a function by using the function selection screen. This may lead to a deterioration in operability for the user.

SUMMARY OF THE INVENTION

The present invention has been made in consideration of the above problem, and provides a technique of switching the display screen from the standby screen to the function selection screen in a short period of time in an information processing apparatus which displays screens on a display unit based on the screen data obtained from a server apparatus.

According to one aspect of the present invention, there is provided an information processing apparatus which is communicable, via a network, with a server apparatus which provides screen data, the information processing apparatus comprising: a display control unit configured to display a standby screen based on screen data obtained from the server apparatus on a display unit of the information processing apparatus in a standby state of the information processing apparatus; an obtaining unit configured to obtain, from the server apparatus, screen data of a function selection screen for accepting selection of a function to be used, of functions of the information processing apparatus, while the display control unit displays the standby screen on the display unit; an acceptance unit configured to accept a close instruction for the standby screen displayed on the display unit by the display control unit; and a display switching unit configured to switch display of the display unit from the standby screen to the function selection screen based on the screen data obtained by the obtaining unit when the acceptance unit accepts the close instruction.

According to another aspect of the present invention, there is provided a method of controlling an information processing apparatus which is communicable, via a network, with a server apparatus which provides screen data, the method comprising: displaying a standby screen based on screen data obtained from the server apparatus on a display unit of the information processing apparatus in a standby state of the information processing apparatus; obtaining, from the server apparatus, screen data of a function selection screen for accepting selection of a function to be used, of functions of the information processing apparatus, while the standby screen is displayed on the display unit; accepting a close instruction for the standby screen displayed on the display unit; and switching display of the display unit from the standby screen to the function selection screen based on the screen data obtained in the obtaining when the close instruction is accepted in the accepting.

The present invention can provide a technique of switching the display screen from the standby screen to the function selection screen in a short period of time in an information processing apparatus which displays screens on a display unit based on the screen data obtained from a server apparatus.

Further features of the present invention will become apparent from the following description of exemplary embodiments (with reference to the attached drawings).

BRIEF DESCRIPTION OF THE DRAWINGS

FIG. 4 is a flowchart showing a procedure for the operation of a Web browser 300 in the first embodiment;

FIG. 6 is a flowchart showing a procedure for the operation of a Web browser 300 in the second embodiment.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

Arrangement of Information Processing System

Figure 1:
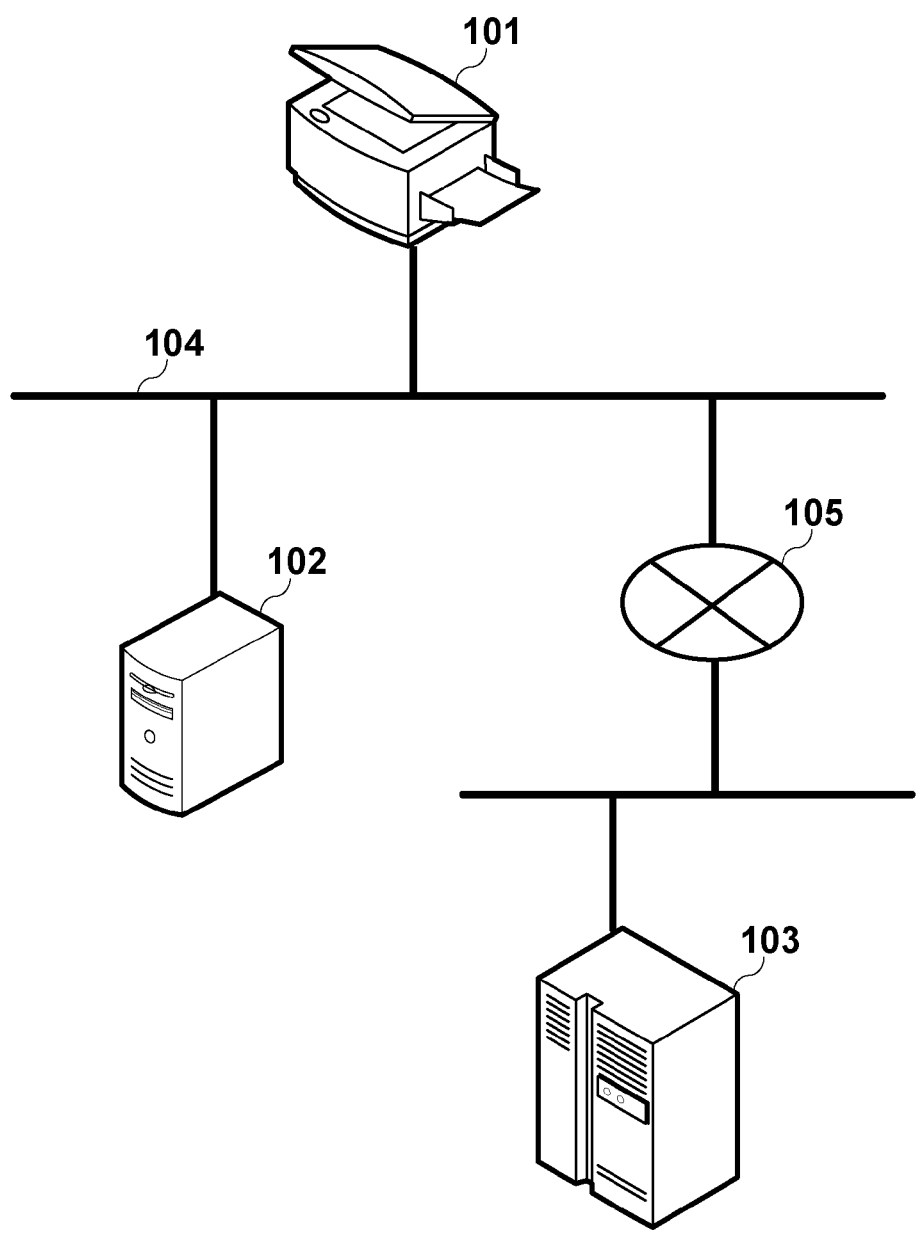
FIG. 1 is a view showing an overall information processing system in the first embodiment.

FIG. 1 is a view showing the arrangement of an overall information processing system including an information processing apparatus in the first embodiment. In this system, an MFP 101 is connected to Web servers 102 and 103 via networks. More specifically, the MFP 101 is connected to the Web server 102 via a LAN (Local Area Network) 104, and is connected to the Web server 103 via Internet 105. The MFP 101 and the Web servers 102 and 103 can communicate with each other via the LAN 104 and Internet 105. In this embodiment, the Web servers 102 and 103 function as server apparatuses which provide screen data, and the MFP 101 functions as an information processing apparatus which can communicate with the server apparatuses via networks.

The MFP 101 has a copy function of scanning a paper medium to read an image on the paper medium and obtain scan data, and forming the image based on the scan data on the sheet, thereby printing the image on the sheet. The MFP 101 is also equipped with a Web browser, and has a Web browser as software program as will be described later. The MFP 101 can obtain contents held in the Web servers 102 and 103 via the networks by using the Web browser and display the screens based on the obtained contents on the display unit.

<Hardware Arrangement of MFP 101>

Figure 2:
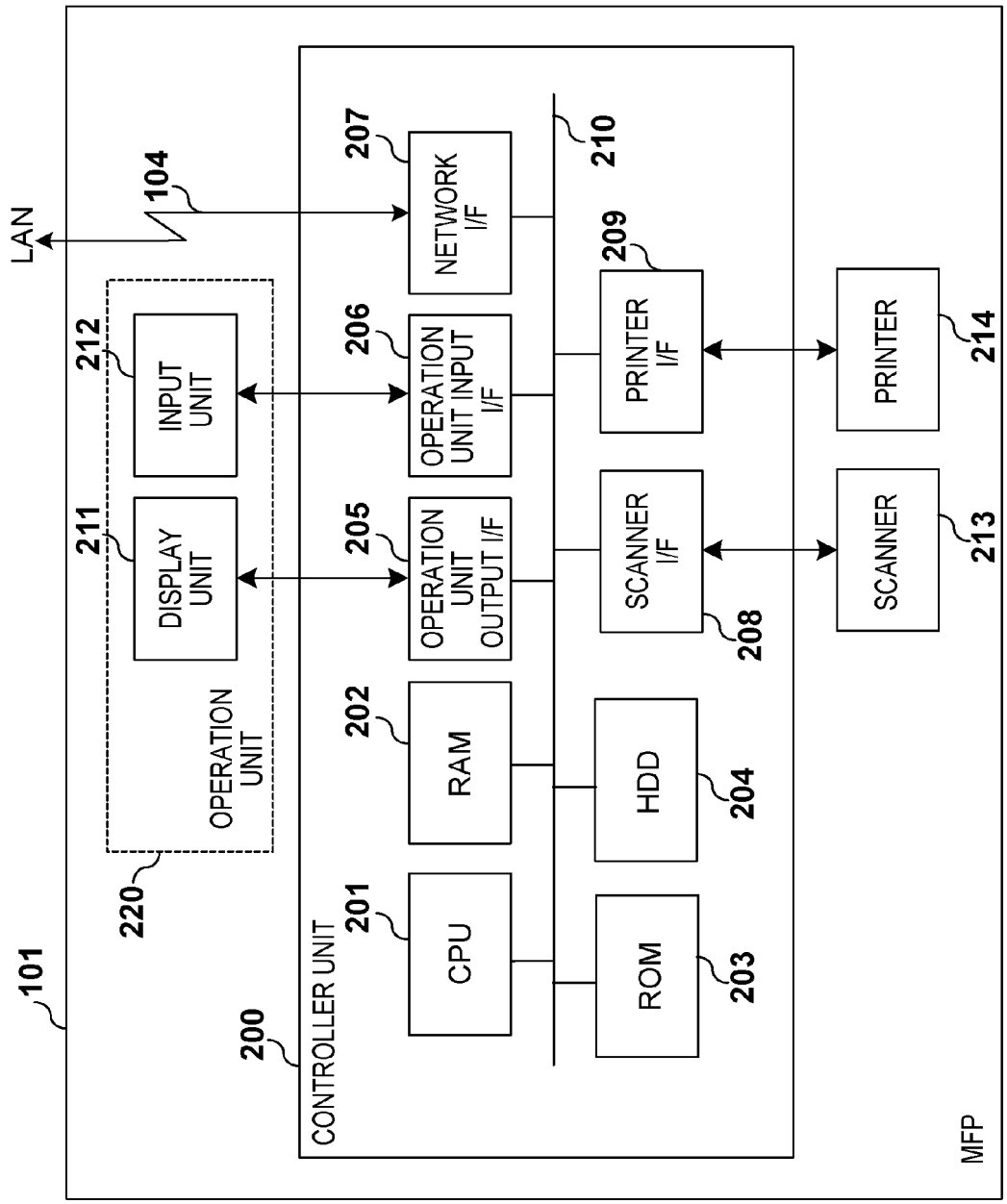
FIG. 2 is a block diagram showing the hardware arrangement of an MFP 101 in the first embodiment.

FIG. 2 is a block diagram showing the hardware arrangement of the MFP 101 according to the first embodiment. The MFP 101 includes a controller unit 200, a scanner 213, a printer 214, and an operation unit 220. The operation unit 220 includes a display unit 211 and an input unit 212. As shown in FIG. 2, the scanner 213 and the printer 214 are connected to the controller unit 200 via a scanner interface (I/F) 208 and a printer I/F 209, respectively. The display unit 211 and input unit 212 of the operation unit 220 are connected to the controller unit 200 via an operation unit output I/F 205 and an operation unit input I/F 206, respectively. The controller unit 200 is connected to the LAN 104 via a network I/F 207.

The controller unit 200 includes a CPU (Central Processing Unit) 201, a RAM (Random Access Memory) 202, a ROM (Read Only Memory) 203, an HDD (Hard Disk Drive) 204, the operation unit output I/F 205, the operation unit input I/F 206, the network I/F 207, the scanner I/F 208, and the printer I/F 209. These devices are connected to a system bus 210. The CPU 201 activates the MFP 101 based on the boot program stored in the ROM 203. In addition, the CPU 201 executes various types of processing in the MFP 101 by reading out and executing various types of control programs stored in the HDD 204. In this case, the CPU 201 uses the RAM 202 as a work area. The HDD 204 stores various types of control programs including a software program for a Web browser 300. The HDD 204 stores the scan data obtained by scanning by the scanner 213, the content data obtained from external apparatuses such as the Web servers 102 and 103 via the network I/F 207, and the like.

The operation unit output I/F 205 performs output control on data to the display unit 211. The operation unit input I/F 206 performs input control on data from the display unit 211. The network I/F 207 is connected to the LAN 104 to perform input/output control on information via the LAN 104. The scanner I/F 208 inputs image data from the scanner 213 to the controller unit 200, and inputs and outputs control data for controlling the scanner 213. The printer I/F 209 outputs output image data from the controller unit 200 to the printer 214, and inputs and outputs control data for controlling the printer 214.

The display unit 211 of the operation unit 220 includes a display device such as an LCD (Liquid Crystal Display) or an LED (Light Emitting Diode) and functions as a display interface which displays information for the user. The input unit 212 of the operation unit 220 includes an input device such as a touch panel and a hard key provided on the display unit 211, and functions as an input interface which accepts an input from the user. The scanner 213 includes an optical reading device such as a CCD (Charge Coupled Device) and has a function of reading an image on a paper medium as electronic image data by optically scanning the paper medium. The printer 214 has a function of forming (printing), based on the electronic image data, an image on a printing medium such as a sheet.

<Software Arrangement of MFP 101>

Figure 3:
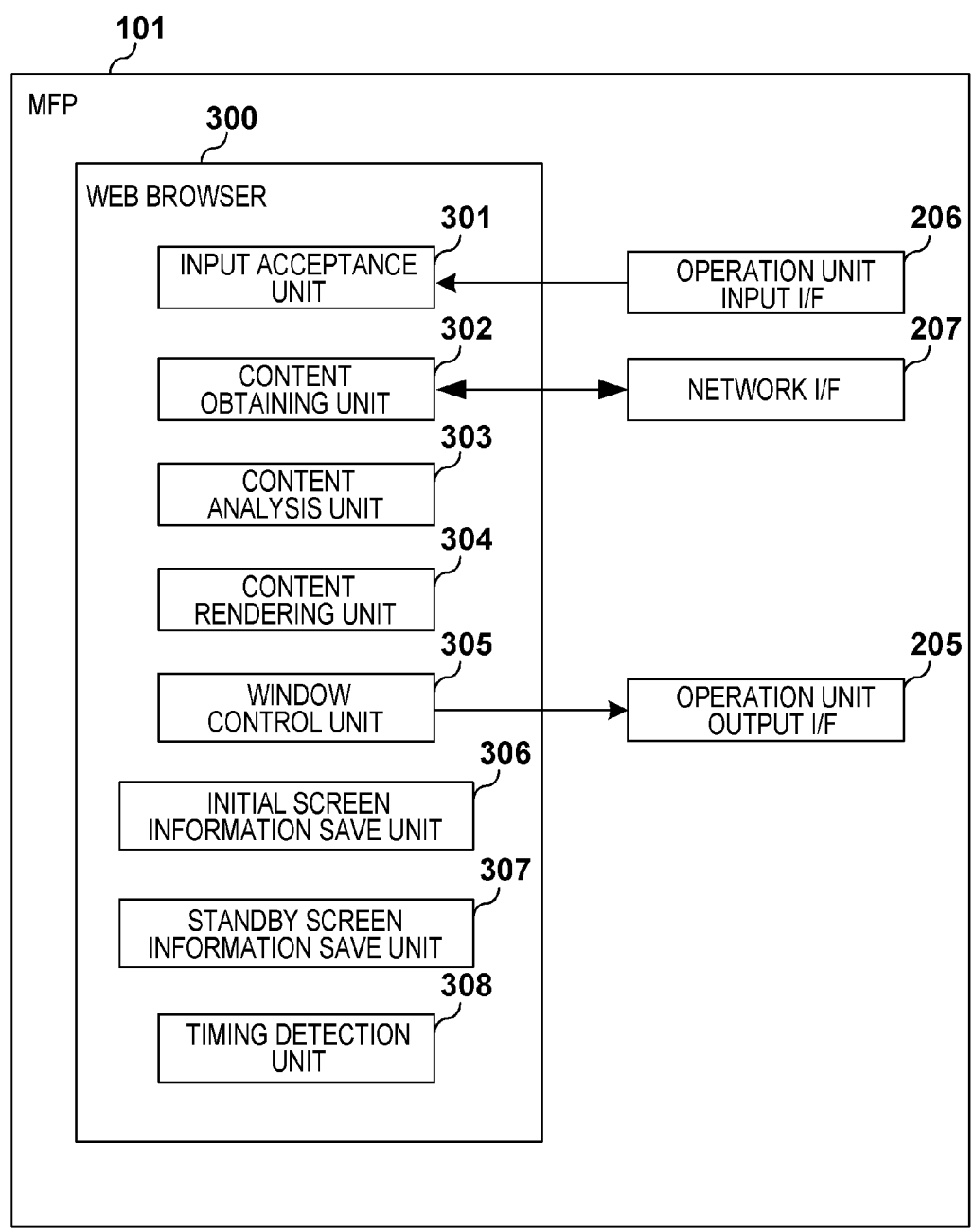
FIG. 3 is a block diagram showing the software arrangement of the MFP 101 in the first embodiment.

FIG. 3 is a block diagram showing an example of a software configuration in the MFP 101 according to the first embodiment. The MFP 101 is equipped with the Web browser 300 including the plurality of functional units shown in FIG. 3, as an installed software program. As shown in FIG. 3, the Web browser 300 is implemented by a plurality of software modules corresponding to a plurality of functional units each configured to perform specific processing and a software module (not shown) configured to perform other processing. The CPU 201 implements the Web browser 300 and the respective functional units on the MFP 101 by reading out and executing the control programs stored in the ROM 203 or the HDD 204.

The Web browser 300 inputs/outputs data to/from the operation unit input I/F 206, the operation unit output I/F 205, and the network I/F 207 by using an input acceptance unit 301, a content obtaining unit 302, and a window control unit 305. The input acceptance unit 301 accepts, via the operation unit input I/F 206, instructions input by the user using the input unit 212 of the operation unit 220. More specifically, the input acceptance unit 301 accepts various kinds of instructions from the user such as an instruction to set a URL.

The content obtaining unit 302 communicates with an external Web server (at least one of the Web servers 102 and 103) via the network I/F 207 to obtain a Web content from the Web server. More specifically, in response to an instruction from the user, the content obtaining unit 302 requests the Web server to transmit a Web content by communicating with the Web server using a communication protocol such as the HTTP protocol. In addition, the content obtaining unit 302 receives the Web content transmitted from the Web server in accordance with the request. A content analysis unit 303 analyzes the Web content obtained by the content obtaining unit 302 to create the screen data of a screen corresponding to the Web content.

A Web content is data (screen data) mainly including a file described in a structured language such as HTML, an image data file, and the like and indicating the information of the screen to be displayed on the display unit 211. The MFP 101 receives the Web content of an operation screen such as a function selection screen or standby screen from a Web server.

A content rendering unit 304 renders an operation screen into a window screen whose display is controlled by the window control unit 305 based on the analysis result obtained by the content analysis unit 303. In this case, in practice, the window screen corresponds to a memory area secured in the RAM 202. When rendering a screen based on the analysis result obtained by the content analysis unit 303, the content rendering unit 304 requests the window control unit 305 to secure a memory area corresponding to the new window screen in the RAM 202.

In accordance with the request from the content rendering unit 304, the window control unit 305 secures a memory area corresponding to the window screen in the RAM 202, and notifies the content rendering unit 304 of the corresponding information. Upon receiving the notification from the window control unit 305, the content rendering unit 304 stores the image data of a display image corresponding to the display unit 211 in the notified memory area in the RAM 202. The content rendering unit 304 can create the image data of display images corresponding to a plurality of window screens and store the created data in the corresponding memory area secured in the RAM 202.

The window control unit 305 outputs the image data stored by in the RAM 202 by the content rendering unit 304 to the display unit 211 via the operation unit output I/F 205 to make the display unit 211 display the window screen based on the image data. When a plurality of window screens are created by the content rendering unit 304 and the plurality of corresponding image data are stored in the RAM 202, the window control unit 305 controls a display form to be used when making the display unit 211 display the plurality of window screens. For example, the window control unit 305 performs control to display, on the foreground in the display area of the display unit 211, a specific one of the plurality of window screens rendered by the content rendering unit 304. This display control may be performed in accordance with the instruction input by the user via the input unit 212.

In general, since the display area of the display unit 211 provided on the MFP 101 is small, the number of window screens which can be simultaneously displayed in the display area is often limited to one. In this embodiment, if a plurality of window screens to be displayed in the display area exist, the window control unit 305 performs display control on the display unit 211 so as to allow the plurality of window screens to be selectively displayed within one window screen. In addition, the window control unit 305 displays tabs for switching display between window screens within one window screen displayed on the display unit 211 so as to execute such display control in accordance with an instruction from the user. The user operates the input unit 212 to input an instruction to select one of the plurality of tabs displayed on the display unit 211 to make the display unit 211 display one of a plurality of window screens. In this manner, the window control unit 305 can selectively switch and display, on the display unit 211, a plurality of screens corresponding to the plurality of screen data provided from the Web server in accordance with an instruction from the user.

An initial screen information save unit 306 saves, in the RAM 202 or the HDD 204, initial screen information representing a Web content which the Web browser 300 displays as an initial screen (homepage) on the display unit 211 in accordance with an instruction from the user. In this embodiment, initial screen information is represented by a URL (address information) indicating the location of the Web content displayed as an initial screen in the network. The initial screen of the Web browser 300 is generally called "homepage". This embodiment sets, as an initial screen, a function selection screen for selecting a function, of the plurality of functions of the MFP 101, which is to be used. In this case, the initial screen displays a plurality of items respectively corresponding to the functions of the MFP 101 as options for the user. Note that the initial screen information in this embodiment corresponds to the first specifying information for specifying the screen data of the function selection screen.

In this embodiment, the Web browser 300 specifies a Web content to be displayed on the display unit 211 based on the initial screen information (URL) saved by the initial screen information save unit 306. When displaying the initial screen on the display unit 211, the Web browser 300 obtains the Web content of the initial screen from the Web server indicated by the URL saved by the initial screen information save unit 306.

In accordance with an instruction from the user, a standby screen information save unit 307 saves, in the RAM 202 or the HDD 204, the Web content to be displayed by the Web browser 300 as a standby screen on the display unit 211 in the standby state of the MFP 101. In this embodiment, the standby screen information is represented by a URL (address information) indicating the location of a Web content displayed as a standby screen in the network. This standby screen information corresponds to the second specifying information for specifying the screen data of the standby screen.

The display unit 211 displays the standby screen at a predetermined timing, for example, the timing at which the MFP 101 starts up from a power-off state, the timing at which user's log-in to the MFP 101 is complete, or the timing at which a predetermined period of time has elapsed since the user stopped performing operation with respect to the MFP

101. In addition, the standby screen may be used as a screen for displaying advertising information for the user or a screen for displaying notification information for the user.

The standby screen displays no entry fields for inputting some kinds of setting information but displays a close button for closing the screen and the like. This inhibits the user from inputting any kinds of setting information to the MFP 101 but allows the user to input only a close instruction for the standby screen. In this embodiment, when the user presses the close button via the input unit 212 while the standby screen is displayed on the display unit 211, the Web browser 300 closes the standby screen and switches the display of the display unit 211 from the standby screen to the initial screen (function selection screen).

A timing detection unit 308 detects various operation timings in the MFP 101, and creates timing information indicating each detected timing. The timing detection unit 308 detects a predetermined timing such as the timing at which the MFP 101 starts up from a power-off state, the timing at which user's log-in to the MFP 101 is complete, the timing at which the MFP 101 returns from a sleep state, or the timing at which a predetermined period of time has elapsed since the user stopped performing operation with respect to the MFP 101.

When the timing detection unit 308 detects a predetermined timing, the Web browser 300 executes processing corresponding to the detected content. For example, the Web browser 300 obtains the Web content of the standby screen or the like from the Web server by using the content obtaining unit 302 in accordance with timing information from the timing detection unit 308. In addition, the Web browser 300 may cause the window control unit 305 to switch the window screen displayed on the display unit 211 to another window screen in accordance with the timing information.

Note that the timing detection unit 308 may request a device in the MFP 101 to notify, when an event associated with a target timing has occurred, information indicating the occurrence of the event, as well as the timing detection unit 308 detects the target timing itself. Upon receiving such a request from the timing detection unit 308, at the occurrence of the event associated with the target timing, the device may notify the timing detection unit 308 of the corresponding information.

<Display Processing for Standby Screen and Initial Screen>

A procedure for processing for displaying a standby screen and an initial screen at specific timings, which is executed in the MFP 101 according to this embodiment, will be described with reference to the flowchart of FIG. 4. The CPU 201 implements the operation in each step of the flowchart of FIG. 4 by executing a control program. The Web browser 300 executes all these operations.

In step S401, the Web browser 300 accepts timing information from the timing detection unit 308. In step S402, the Web browser 300 determines whether timing information indicating the timing of displaying the standby screen on the display unit 211 has been notified as timing information from the timing detection unit 308. For example, as described above, the Web browser 300 determines whether information indicating one of the following timings has been notified: the timing at which the MFP 101 starts up from a power-off state, the timing at which user's log-in to the MFP 101 is complete, the timing at which the MFP 101 returns from a sleep state, or the timing at which a predetermined period of time has elapsed since the user stopped performing operation with respect to the MFP 101. If such timing information has been notified, the Web browser 300 determines that the MFP 101 has shifted to the standby state, and the display timing of the standby screen has come. If the Web browser 300 determines in step S402 that such timing information has not been notified, it returns the process to step S401. If the Web browser 300 determines that such information has been notified, it advances the process to step S403.

In step S403, the Web browser 300 determines whether the standby screen information save unit 307 has already saved the URL (standby screen information) of a Web content displayed as a standby screen. If the Web browser 300 determines that the standby screen information has been saved, it advances the process to step S404. If the Web browser 300 determines that such information has not been saved, it advances the process to step S411 to display the initial screen without displaying the standby screen.

In step S404, the Web browser 300 obtains the Web content of the standby screen and displays the standby screen on the display unit 211 based on the obtained Web content. More specifically, the Web browser 300 causes the content obtaining unit 302 to obtain a Web content from the Web server indicated by the standby screen information (URL) saved by the standby screen information save unit 307 by using the content obtaining unit 302. The Web browser 300 causes the content analysis unit 303 to analyze the obtained Web content, and create the screen data of the standby screen based on the analysis result. In addition, the Web browser 300 causes the content rendering unit 304 to render the standby screen into a window screen based on the created screen data. Lastly, the Web browser 300 causes the window control unit 305 to display the rendered window screen as a standby screen on the foreground in the display area of the display unit 211. In this manner, in step S404, the Web browser 300 displays the standby screen based on the screen data obtained from the Web server on the display unit 211 in the standby state of the MFP 101.

In step S405, the Web browser 300 determines whether it has accepted a close instruction for the standby screen being displayed on the display unit 211. If, for example, screen close processing described in JavaScript® in the Web content being displayed as a standby screen is executed, the Web browser 300 determines that it has accepted a close instruction. Alternatively, if the input acceptance unit 301 determines that the user has operated the touch panel, hard key, or the like provided on the input unit 212 while the standby screen is displayed, the Web browser 300 determines that it has accepted a close instruction. If the Web browser 300 determines in step S405 that it has accepted a close instruction for the standby screen, it advances the process to step S410. If the Web browser 300 determines that it has accepted no close instruction, it advances the process to step S406.

In step S406, the Web browser 300 obtains the Web content (screen data) of the initial screen (function selection screen) while the standby screen is displayed on the display unit 211. More specifically, the Web browser 300 causes the content obtaining unit 302 to obtain a Web content from the Web server indicated by the initial screen information (URL) saved by the initial screen information save unit 306. In this manner, the Web browser 300 obtains the Web content of the initial screen from the Web server in advance while the standby screen is displayed on the display unit 211. This allows the Web browser 300 to switch the display of the display unit 211 from the standby screen to the initial screen within a short period of time upon receiving a close instruction for the standby screen as compared with the operation of obtaining the Web content of the initial screen upon reception of the close instruction.

In this embodiment, in step S406, the Web browser 300 also renders the initial screen into a window screen displayed on the display unit 211 based on the obtained Web content while the standby screen is displayed on the display unit 211. More specifically, the Web browser 300 causes the content analysis unit 303 to analyze the obtained Web content, and create the screen data of the initial screen based on the analysis result. The Web browser 300 causes the content rendering unit 304 to render the initial screen into a window screen based on the created screen data. In this case, the Web browser 300 inhibits the window control unit 305 from outputting the window screen of the initial screen rendered by the content rendering unit 304 to the operation unit output I/F 205. The window control unit 305 holds the image data of a display image corresponding to the window screen of the initial screen in the RAM 202.

In this manner, the Web browser 300 creates a display image corresponding to the display unit 211 from the Web content (screen data) obtained from the Web server during the display of the standby screen. This allows the Web browser 300 to further shorten the time required to switch the display of the display unit 211 from the standby screen to the initial screen upon reception of a close instruction for the standby screen. In a case where the Web browser 300 executes only obtaining the Web content of the initial screen in step S406, the Web browser 300 may perform the processing of rendering the initial screen into a window screen from the obtained Web content when displaying the initial screen on the display unit 211 in step S409 or S411 (to be described later).

In addition, while the standby screen is displayed on the display unit 211, the window control unit 305 may restrict display, in the window screen (standby screen) being displayed on the display unit 211, of tabs for switching the display of the window screen between a plurality of window screens. That is, the window control unit 305 may restrict switching of the display of the display unit 211 from the standby screen to any screen other than the initial screen (function selection screen) while the standby screen is displayed on the display unit 211. This can prevent the user from performing operation against the intention of the creator of the Web content of the standby screen, in a case where the creator has intended to switch the display of the display unit 211 to the initial screen (function selection screen) when the standby screen is closed.

In step S407, the Web browser 300 determines whether the content rendering unit 304 has completed rendering of the initial screen. If the Web browser 300 determines that the content rendering unit 304 has not completed rendering of the initial screen, it returns the process to step S405. If the Web browser 300 determines that the content rendering unit 304 has completed rendering of the initial screen, it advances the process to step S408.

In step S408, the Web browser 300 determines whether it has accepted a close instruction for the standby screen being displayed on the display unit 211, as in step S405. The Web browser 300 repeats the determination processing in step S408 as long as determining that it has not received a close instruction for the standby screen. When the Web browser 300 determines that it has received a close instruction, it advances the process to step S409.

Upon receiving a close instruction in step S408, the Web browser 300 switches the display of the display unit 211 from the standby screen to the initial screen (function selection screen) in step S409. More specifically, the window control unit 305 closes the window screen displayed as a standby screen on the display unit 211, and outputs the window screen (display image) rendered as an initial screen in the RAM 202 to the display unit 211 via the operation unit output I/F 205. This allows the display screen of the display unit 211 to be switched from the standby screen to the initial screen, and allows the initial screen to be displayed on the foreground in the display area of the display unit 211. In this embodiment, since the initial screen has already been rendered as a window screen in the RAM 202, the Web browser 300 switches the display screen from the standby screen to the initial screen within a short period of time. As described above, the Web browser 300 functions as a display switching unit in step S409. Subsequently, the Web browser 300 terminates the series of processing shown in FIG. 4.

When the Web browser 300 advances the process from step S405 to step S410, it causes the window control unit 305 to close the window screen displayed as a standby screen on the display unit 211 in step S410 as in step S409. In addition, in step S411, the Web browser 300 obtains the Web content of the initial screen from the Web server, and displays the initial screen on the display unit 211 based on the obtained Web content.

In this case, as in step S406, the Web browser 300 renders the initial screen into a window screen, based on the Web content obtained from the Web server, by using the content obtaining unit 302, the content analysis unit 303, and the content rendering unit 304. In addition, the Web browser 300 causes the window control unit 305 to output the window screen rendered in the RAM 202 to the display unit 211 via the operation unit output I/F 205. In this manner, the Web browser 300 displays the initial screen on the display unit 211. Thereafter, the Web browser 300 terminates the series of processing shown in FIG. 4.

<Example of Display of Operation Screen by Web Browser 300>

Figure 5A:
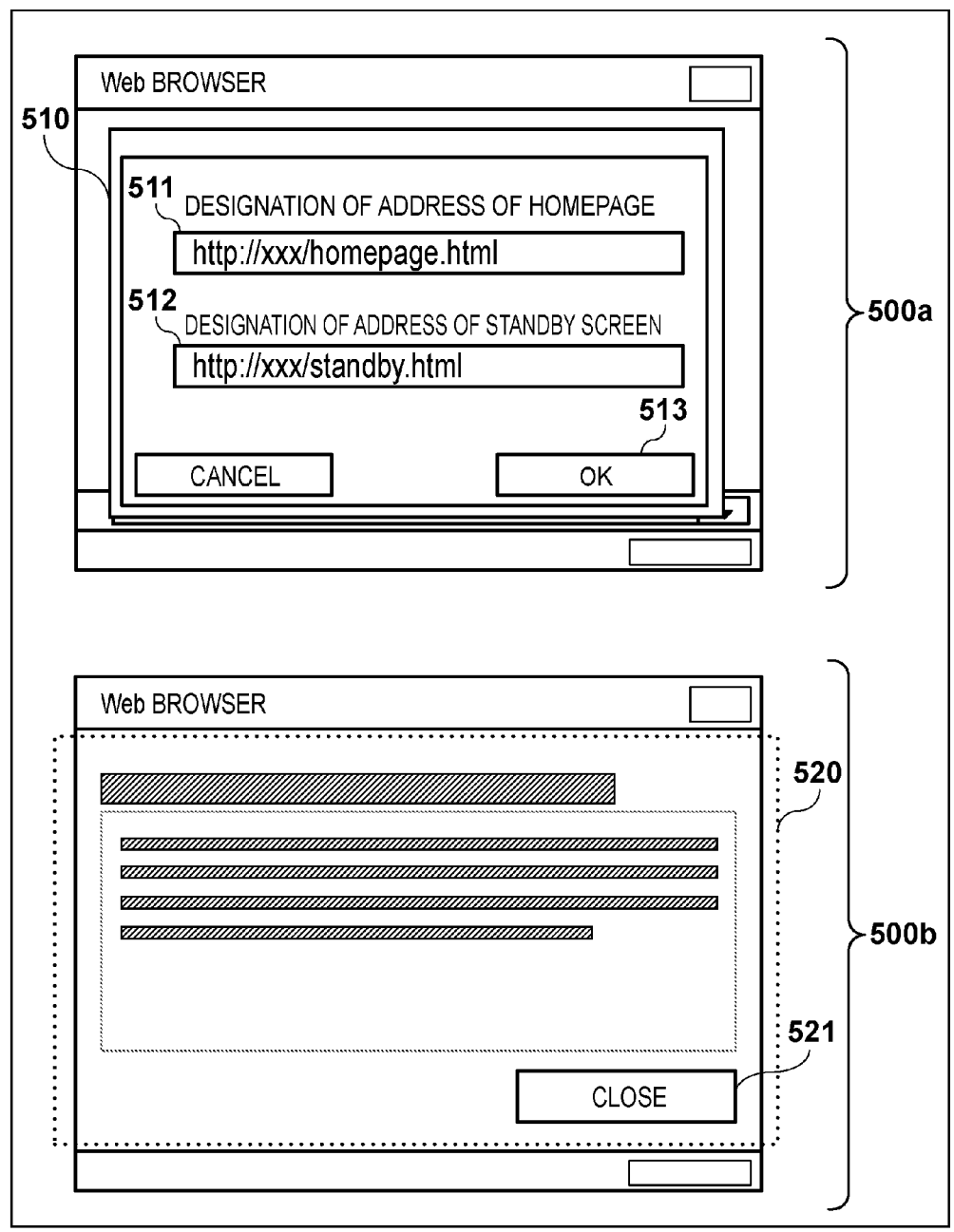
FIGS. 5A and 5B are views showing an example of the operation screen displayed on a display unit 211 of the MFP 101 in the first embodiment.
Figure 5B:
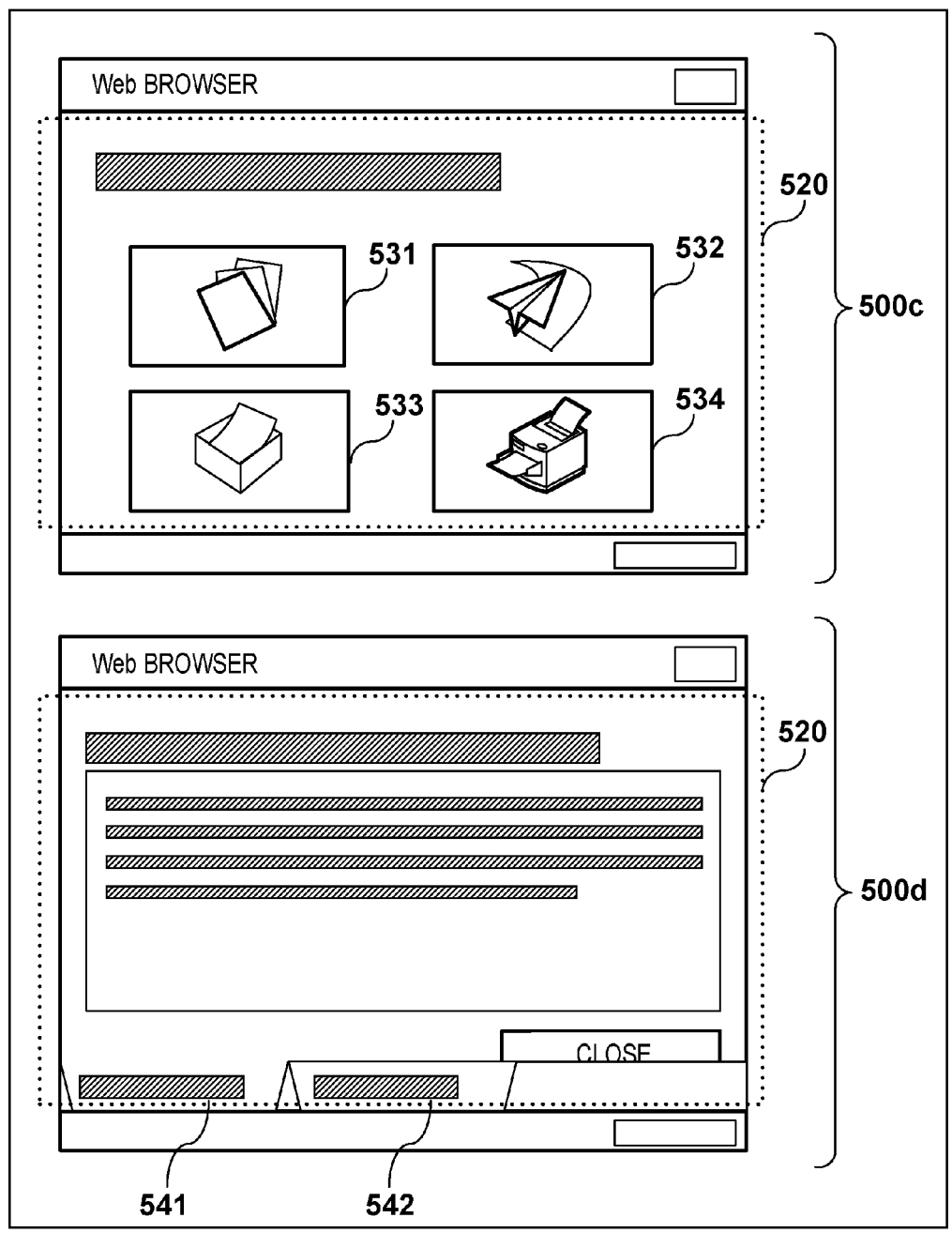

A concrete example of the operation screen displayed on the display unit 211 based on the processing shown in FIG. 4 will be described next with reference to FIGS. 5A and 5B. Reference numerals 500a and 500b in FIG. 5A and reference numerals 500c and 500d in FIG. 5B denote examples of operation screens which the Web browser 300 displays on the display unit 211. Referring to FIGS. 5A and 5B, an area 520 corresponds to the display area of the display unit 211. The display area of the display unit 211 displays a portion, of the window screen rendered by the Web browser 300, which is included in the area 520 in FIGS. 5A and 5B. The operation screens 500a to 500d are displayed on the display unit 211 when the window control unit 305 outputs the window screens rendered by the content rendering unit 304 of the Web browser 300 to the display unit 211 via the operation unit output I/F 205.

Reference numeral 500a in FIG. 5A denotes an example of a screen for setting URLs (initial screen information and standby screen information) corresponding to the Web contents displayed as an initial screen and a standby screen. When the user issues an instruction to display a screen for setting initial screen information and standby screen information via the operation unit 220, the Web browser 300 displays a dialog box 510 on the display unit 211 as indicated by reference numeral 500a. The dialog box 510 includes entry fields 511 and 512 for allowing the user to input URLs respectively corresponding to the initial screen information and standby screen information.

When the user selects the entry fields 511 and 512 via the operation unit 220, the Web browser 300 displays a software keyboard (not shown) on the display unit 211. When the user inputs URLs to the entry fields 511 and 512 by using the displayed software keyboard and presses an OK button 513, the initial screen information save unit 306 and the standby screen information save unit 307 respectively confirm the URLs as setting information. The initial screen information save unit 306 and the standby screen information save unit 307 respectively save the confirmed setting information (URLs) as initial screen information and the standby screen information in the RAM 202 and the HDD 204.

Reference numeral 500b in FIG. 5A denotes an example of the standby screen displayed on the display unit 211 of the Web browser 300 in step S404 or S409. In step S404, the window control unit 305 causes the display unit 211 to display the standby screen rendered into a window screen by the content rendering unit 304, as indicted by reference numeral 500b. Processing for closing the standby screen is described in JavaScript® in the Web content displayed on the display unit 211 as a standby screen. In this embodiment, a close button 521 for closing the screen is rendered in the standby screen based on the description corresponding to the closing processing included in the Web content. In steps S405 and S408, the user inputs a close instruction by pressing the close button 521 via the operation unit 220.

As described above, when obtaining and rendering the Web content of the initial screen during the display of the standby screen in step S406, the Web browser 300 does not display any tab for switching the display of the window screen to a different window screen in the standby screen. Reference numeral 500d in FIG. 5B denotes an example of the standby screen displayed as a comparative example relative to the screen 500b. On the screen 500d, the Web browser 300 renders the standby screen into one window screen, and renders the initial screen into another window screen. In addition, the Web browser 300 displays, in the area 520, tabs 541 and 542 for switching one of the rendered windows to a window screen to be displayed on the foreground. The tab 541 is associated with the window screen of the standby screen currently displayed on the foreground, and the tab 542 is associated with the window screen of the initial screen.

In general, the titles of the respective window screens are displayed in text on the tabs 541 and 542. When the user selects one of the tabs via the operation unit 220 based on the texts displayed on the tabs 541 and 542, the Web browser 300 displays the window screen associated with the selected tab on the foreground. On the screen 500d, when the user selects a tab 532, the Web browser 300 switches the displayed window screen to the window screen of the initial screen. However, displaying such tabs may cause the user to perform operation against the intention of the creator of the content, as described above. As a result, the display window may shift to a screen different from the one intended by the content creator.

In this embodiment, even when the Web browser 300 creates the initial screen as a window screen different from the standby screen during the display of the standby screen, the Web browser 300 does not render any tab for switching window screens in the display area of the display unit 211, as indicated by reference numeral 500b. That is, the Web browser 300 restricts the display of a tab for switching window screens in the display area of the display unit 211 during the display of the standby screen.

Reference numeral 500c in FIG. 5B denotes an example of the initial screen displayed by the Web browser 300 on the display unit 211 in step S409 or S411. In this embodiment, the function selection screen is set as an initial screen. As indicated by the screen 500c, function selection buttons 531 to 534 are rendered on the initial screen based on the Web contents obtained from the Web server. The function selection buttons 531 to 534 respectively correspond to a plurality of different functions of the MFP 101. When the user selects one of the function selection buttons 531 to 534 via the operation unit 220, the MFP 101 executes a function corresponding to the selected function selection button.

In general, the initial screen sometimes includes many buttons, links, and the like in addition to the function selection buttons 531 to 534. If the initial screen includes many buttons, links, and the like which can be operated, the descriptions of Web contents for displaying the initial screen can be complicated. In such a case, it takes much time for the Web browser 300 to read and analyze Web contents, resulting in an increase in the time interval from the instant the Web content of the initial screen is obtained to the instant the initial screen is displayed on the display unit 211.

In this embodiment, in step S404, the Web browser 300 creates the initial screen as a window screen different from the standby screen in the RAM 202 in advance in the time interval from the instant the display of the standby screen starts to the instant the close instruction is input. In addition, in step S409, when the user inputs a close instruction for the displayed standby screen, the Web browser 300 switches the display screen from the standby screen to the initial screen only by window screen switching performed by the window control unit 305. Creating the initial screen as a window screen in the RAM 202 in advance upon displaying the standby screen makes it possible to quickly switch the display screen to the initial screen at the timing when the standby screen is closed.

As described above, in the first embodiment, in the MFP 101 in the standby state, the Web browser 300 obtains the screen data of the function selection screen from the Web server while displaying the standby screen based on the screen data obtained from the Web server on the display unit 211. Thereafter, when accepting a close instruction for the standby screen during the display of the standby screen afterward, the Web browser 300 switches the display of the display unit 211 from the standby screen to the function selection screen based on the obtained screen data. As described above, according to this embodiment, the MFP 101 can switch the display screen from the standby screen to the function selection screen in a short period of time by obtaining the screen data of the function selection screen from the Web server during the display of the standby screen.

In addition, upon obtaining the screen data of the function selection screen from a Web server, the MFP 101 according to this embodiment may create a display image corresponding to the display unit 211 from the obtained screen data during the display of the standby screen. This allows the MFP 101 to switch the display screen from the standby screen to the function selection screen in a shorter time.

Second Embodiment

In the first embodiment, the standby screen information save unit 307 saves standby screen information (URL) for specifying a standby screen in advance as information set based on an input from the user via the operation unit 220. The second embodiment allows a Web browser 300 to use standby screen information without requiring any input from the user. More specifically, standby screen information is included in part of the Web content of the initial screen provided from a Web server, thereby allowing an MFP 101 to simultaneously obtain the initial screen and the standby screen information. For the sake of descriptive simplicity, the following description will be mainly focused on the differences between the first and second embodiments.

A procedure for the processing executed by the MFP 101 according to this embodiment will be described with reference to the flowchart of FIG. 6. The processing from step S601 to step S602 is the same as that from step S401 to step S402 in the first embodiment. If the Web browser 300 determines in step S402 that the display timing of the standby screen has come, it advances the process to step S601 to obtain the Web content of the initial screen from the Web server indicated by the initial screen information (URL) saved by an initial screen information save unit 306. In step S601, the Web browser 300 need not obtain all the Web content including an image file and the like but may obtain only a content description file such as an HTML file. That is, the Web browser 300 obtains, from the Web server, partial screen data (content description file) of the screen data of the initial screen (function selection screen) specified by the initial screen information.

In step S602, the Web browser 300 causes the content analysis unit 303 to analyze the information of the obtained Web content (content description file), and determines whether the content includes information (standby screen information) associated with the Web content displayed as a standby screen. That is, the Web browser 300 determines whether it can extract standby screen information (second specifying information) for specifying the screen data of the standby screen from the partial screen data of the initial screen obtained from the Web server.

In this embodiment, standby screen information is not designated by the user via a screen 500a in FIG. 5A but is included in the Web content of the initial screen provided from the Web server. For example, the Web server notifies the MFP 101 of standby screen information as extension header information included in an HTTP response transmitted from itself when receiving a request for the Web content (content description file) of the initial screen. For example, the extension header information can be described in the header portion of the HTTP response as follows:

X-URL-STANDBY: http://xxx/standby.html

A content analysis unit 303 of the Web browser 300 determines the presence/absence of standby screen information based on whether such extension header information is included in the HTTP response received from the Web server. Note however that a Web server may notify the MFP 101 of standby screen information by using a description method such as designating standby screen information using a script from the Web server or adding information using a special tag, instead of using such extension header information.

If the Web browser 300 determines in step S602 that the obtained Web content includes the URL (standby screen information) of the Web content to be displayed as a standby screen, the Web browser 300 extracts the standby screen information from the Web content and then advances the process to step S404. If the Web browser 300 determines that the Web content of the initial screen does not include the standby screen information, it advances the process to step S411 to display the initial screen without displaying the standby screen. The processing in steps S404 to S411 is basically the same as in the first embodiment. Note however that in steps S406 and S411, the Web browser 300 may obtain the remaining screen data, of the screen data of the initial screen, other than the partial screen data obtained in step S601.

As has been described above, in the second embodiment, in the MFP 101 in the standby state, the Web browser 300 obtains standby screen information for specifying the screen data of the standby screen instead of making the user set standby screen information in advance. More specifically, when obtaining screen data from a Web server to display the standby screen in the standby state, the Web browser 300 obtains partial screen data of the initial screen (function section screen) in advance and extracts standby screen information from the obtained data. In addition, the Web browser 300 obtains the screen data of the standby screen specified by the standby screen information extracted from the partial screen data from the Web server, and displays the standby screen on the display unit 211.

This allows the Web server to designate the image data of the standby screen with respect to the MFP 101. As a consequence, the creator of a Web content (screen data) in a Web server can easily change and manage the screen to be displayed as a standby screen. When a Web server provides advertising information or notification information for the user, the above operation facilitates changing and managing such information. It is thus advantageous that the Web server can designate the screen data of the standby screen with respect to the MFP 101.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-155949, filed Jul. 14, 2011, which is hereby incorporated by reference herein in its entirety.

What is claimed is:

1. An information processing apparatus which is communicable, via a network, with a server apparatus which provides screen data, the information processing apparatus comprising:
   a display control unit configured to display a standby screen based on screen data obtained from the server apparatus on a display unit of the information processing apparatus in a standby state of the information processing apparatus;
   an obtaining unit configured to obtain, from the server apparatus, screen data of a function selection screen for prompting a user to select one of a plurality of functions of the information processing apparatus, while the standby screen is being displayed on the display unit and before a close instruction for the standby screen is input by a user operation; and
   a display switching unit configured to switch, in accordance with the close instruction being input, display of the display unit from the standby screen to the function selection screen based on the screen data which is obtained, by the obtaining unit, while the standby screen is being displayed on the display unit and before the close instruction is input.

2. The information processing apparatus according to claim 1, wherein the obtaining unit is further configured to create, upon obtaining screen data of the function selection screen from the server apparatus, a display image corresponding to the display unit from the obtained screen data while the standby screen is being displayed on the display unit, and wherein the display switching unit is configured to, in accordance with the close instruction being input, close the standby screen and display the created display image as the function selection screen.

3. The information processing apparatus according to claim 1, wherein the display control unit is configured to selectively switch and display a plurality of screens corresponding to a plurality of pieces of screen data provided from the server apparatus on the display unit in accordance with an instruction from a user, and restrict switching of display of the display unit from the standby screen to a screen other than the function selection screen while the standby screen is being displayed on the display unit.

4. The information processing apparatus according to claim 1, further comprising a storage unit configured to store first specifying information for specifying screen data of the function selection screen, wherein the display control unit comprises:
a unit configured to obtain, from the server apparatus, partial screen data of screen data of the function selection screen specified by the first specifying information stored in the storage unit;
a unit configured to extract second specifying information for specifying screen data of the standby screen from the obtained partial screen data; and
a unit configured to obtain, from the server apparatus, screen data of the standby screen specified by the extracted second specifying information, and wherein the obtaining unit is configured to obtain remaining screen data, of the screen data of the function selection screen, other than the partial screen data.

5. The information processing apparatus according to claim 1, wherein the standby screen comprises a screen for displaying advertising information for a user or a screen for displaying notification information for the user.

6. The information processing apparatus according to claim 1, wherein the display control unit is configured to display the standby screen on the display unit when the information processing apparatus starts up from a power-off state, when user's log-in to the information processing apparatus is complete, when the information processing apparatus returns from a sleep state, or when a predetermined period of time has elapsed since the user stopped performing operation with respect to the information processing apparatus.

7. A method of controlling an information processing apparatus which is communicable, via a network, with a server apparatus which provides screen data, the method comprising:

displaying a standby screen based on screen data obtained from the server apparatus on a display unit of the information processing apparatus in a standby state of the information processing apparatus;
obtaining, from the server apparatus, screen data of a function selection screen for prompting a user to select one of a plurality of functions of the information processing apparatus, while the standby screen is being displayed on the display unit and before a close instruction for the standby screen is input by a user operation; and
switching, in accordance with the close instruction being input, display of the display unit from the standby screen to the function selection screen based on the screen data which is obtained, in the obtaining, while the standby screen is being displayed on the display unit and before the close instruction is input.

8. A non-transitory computer-readable storage medium storing a computer program for causing a computer to execute steps of a method of controlling an information processing apparatus which is communicable, via a network, with a server apparatus which provides screen data, the method comprising:

displaying a standby screen based on screen data obtained from the server apparatus on a display unit of the information processing apparatus in a standby state of the information processing apparatus;
obtaining, from the server apparatus, screen data of a function selection screen for prompting a user to select one of a plurality of functions of the information processing apparatus, while the standby screen is being displayed on the display unit and before a close instruction for the standby screen is input by a user operation; and
switching, in accordance with the close instruction being input, display of the display unit from the standby screen to the function selection screen based on the screen data which is obtained, in the obtaining, while the standby screen is being displayed on the display unit and before the close instruction is input.

* * * * *